United States Patent
Malloy Desormeaux

(10) Patent No.: US 6,408,140 B1
(45) Date of Patent: Jun. 18, 2002

(54) DUAL FILM IMAGE AND ELECTRONIC IMAGE CAPTURE CAMERA WITH ELECTRONIC IMAGE VERIFICATION OF FILM IMAGE MISFOCUS

(75) Inventor: Stephen G. Malloy Desormeaux, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/577,094

(22) Filed: May 24, 2000

(51) Int. Cl.⁷ .................. G03B 17/18; G03B 17/48; H04N 7/18
(52) U.S. Cl. .................. 396/429; 396/89; 396/147; 396/374
(58) Field of Search ............ 396/89, 93, 147, 396/148, 374, 429, 72, 79; 348/64, 333.01, 333.11, 345, 346

(56) References Cited

U.S. PATENT DOCUMENTS

| | | |
|---|---|---|
| 4,739,411 A | 4/1988 | Bolton |
| 4,780,766 A | 10/1988 | Nutting |
| 4,785,323 A | 11/1988 | Bell |
| 4,888,606 A | 12/1989 | Ota et al. |
| 5,146,261 A | 9/1992 | Soshi |
| 5,329,325 A | 7/1994 | McClellan et al. |
| 5,604,537 A | 2/1997 | Yamazaki et al. |
| 5,822,625 A | 10/1998 | Leidig et al. |
| RE35,963 E | 11/1998 | Fujita et al. |
| 5,845,166 A | 12/1998 | Fellegara et al. |
| 6,014,165 A * | 1/2000 | McIntyre et al. ............. 348/64 |
| 6,081,670 A * | 6/2000 | Madsen et al. ............. 396/147 |
| 6,298,198 B1 * | 10/2001 | Ina et al. .................... 396/287 |

* cited by examiner

Primary Examiner—Alan A. Mathews
(74) Attorney, Agent, or Firm—Roger A. Fields

(57) ABSTRACT

A dual film image and electronic image capture camera matches the captured electronic image shown in an image display with the captured film image in regard to sharpness, when the film image capture lens is misfocused on a far object farther from the camera than the subject because of unintended misranging to the far object, and when the film image capture lens is misfocused on a near object closer to the camera than the subject because of unintended misranging to the near object. Thus, in each instance, the displayed electronic image will indicate the captured film image is out of focus.

11 Claims, 9 Drawing Sheets

DUAL FILM IMAGE AND ELECTRONIC IMAGE CAPTURE CAMERA WITH ELECTRONIC IMAGE VERIFICATION OF FILM IMAGE MISFOCUS

FIELD OF THE INVENTION

The invention relates generally to the field of photography, and in particular to dual film image and electronic image capture cameras. More specifically, the invention relates to a dual film image and electronic image capture camera with electronic image verification of film image misfocus.

BACKGROUND OF THE INVENTION

Recently, a dual image or hybrid camera has been proposed for substantially simultaneously capturing a film image of a subject being photographed and an electronic image of the subject. The camera includes a film image capture or taking lens, an electronic image capture lens, and an image display that shows a captured electronic image of the subject which corresponds to a captured film image of the subject. The displayed electronic image permits one to verify they got the captured film image they wanted. Thus, it is important that the captured electronic image have substantially the same sharpness or degree of focus as the captured film image.

When the film image capture lens is focused on the subject to give a sharp image of the subject, other objects in the scene closer to or farther from the lens than the focused subject do not appear equally sharp. The decline of sharpness is gradual and there is a zone extending in front of and behind the focused subject where the blur is too small to be noticeable and can be accepted as sharp. This zone of acceptable sharpness is known as the depth of field of the lens. The limits of the depth of field of a lens are given by the known equations (in *Encyclopedia of Photography*, Third Edition, Stroebel and Zakia, © 1993 by Butterworth-Heinemann, page 197):

$$Dnear = uf^2/(f^2 + NCu)$$

$$Dfar = uf^2/(f^2 - NCu)$$

where: Dnear is the near limit of the depth of field of the lens;

Dfar is the far limit of the depth of field of the lens;

u is the focused distance;

f is the focal length of the lens;

C is the circle of confusion; and

N is the f-number of the lens aperture. If the depth of field (DOF) is defined as Dfar−Dnear, then the previous equations may be combined and simplified to $$DOF = 2u^2NC/f^2$$

The depth of field is directly proportional to the circle of confusion (C), the f-number (N), and the square of the focused distance (u), and is inversely proportional to the square of the focal length (f).

Typically, the dual image camera includes rangefinder coupled focusing, i.e. automatic focusing, in which a rangefinder first determines the focused distance (u) when a shutter release button is partially depressed, and a focusing mechanism then automatically focuses the film image capture lens at the focused distance when the shutter release button is further depressed. The electronic image capture lens is often separate from the film image capture lens, and has a depth of field (DOF) with near (Dnear) and far (Dfar) limits that are spaced farther apart than the near and far limits of the depth of field of the film image capture lens. Consequently, when the rangefinder misranges to a far object farther from the camera than the subject to automatically focus the film image capture lens on the far object (rather than on the subject), the captured electronic image of the subject can appear to be acceptably sharp or in focus in the image display provided the subject remains in the depth of field of the electronic image capture lens. However, the captured film image of the subject will be blurred or out of focus when the subject is between the near limit of the depth of field of the film image capture lens and the camera. This typically occurs when the subject is positioned off-center in the scene and the rangefinder unintentionally misranges to a centered object in the background of the scene. Alternatively, when the rangefinder misranges to a near object closer to the camera than the subject to automatically focus the film image capture lens on the near object (rather than on the subject), the captured electronic image of the subject can appear to be acceptably sharp or in focus in the display provided the subject remains in the depth of field of the electronic image capture lens. However, the captured film image will be blurred or out of focus when the subject is farther from the camera than the far limit of the depth of field of the film image capture lens. This will occur when the subject is positioned off-center in the scene and the rangefinder unintentionally misranges to a centered object in the foreground of the scene.

SUMMARY OF THE INVENTION

Generally speaking, in a dual image camera the invention assures that the captured electronic image shown in an image display will at least substantially match the captured film image in regard to sharpness when the film image capture lens is misfocused because of unintended misranging. Thus, the displayed electronic image will indicate the captured film image is out of focus.

Preferably, the invention assures that the captured electronic image will match the captured film image when the film image capture lens is misfocused on a far object farther from the camera than the subject because of unintended misranging to the far object, and/or when the film image capture lens is misfocused on a near object closer to the camera than the subject because of unintended misranging to the near object When the film image capture lens is misfocused on a far object farther from the camera than the subject because of misranging to the far object, the electronic image capture lens is focused according to the equation $$U_e = Dnear_f f_e^2 / (f_e^2 - Dnear_f N_e C_e)$$

where: $U_e$ is the focused distance for the electronic image capture lens;

$Dnear_f$ is the near limit of the depth of field of the film image capture lens;

$f_e$ is the focal length of the electronic image capture lens;

$C_e$ is the circle of confusion for the electronic image capture lens; and $N_e$ is the f-number of the lens aperture of the electronic image capture lens, when the subject is between the near limit of the depth of field of the film image capture lens and the camera.

When the film image capture lens is misfocused on a near object closer to the camera than the subject because of misranging to the near object, the electronic image capture lens is focused according to the equation $$U_e = Dfar_f f_e^2 / (f_e^2 + Dfar_f N_e C_e)$$

where: $U_e$ is the focused distance for the electronic image capture lens;

$Dfar_f$ is the far limit of the depth of field of the film image capture lens;

$f_e$ is the focal length of the electronic image capture lens;

$C_e$ is the circle of confusion for the electronic image capture lens; and $N_e$ is the f-number of the lens aperture of the electronic image capture lens, when the subject is farther from the camera than the far limit of the depth of field of the film image capture lens.

DETAILED DESCRIPTION OF THE INVENTION

The invention is disclosed as being embodied preferably in a motorized film advance camera for substantially simultaneously capturing a film image of a subject being photographed and an electronic image of the subject. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
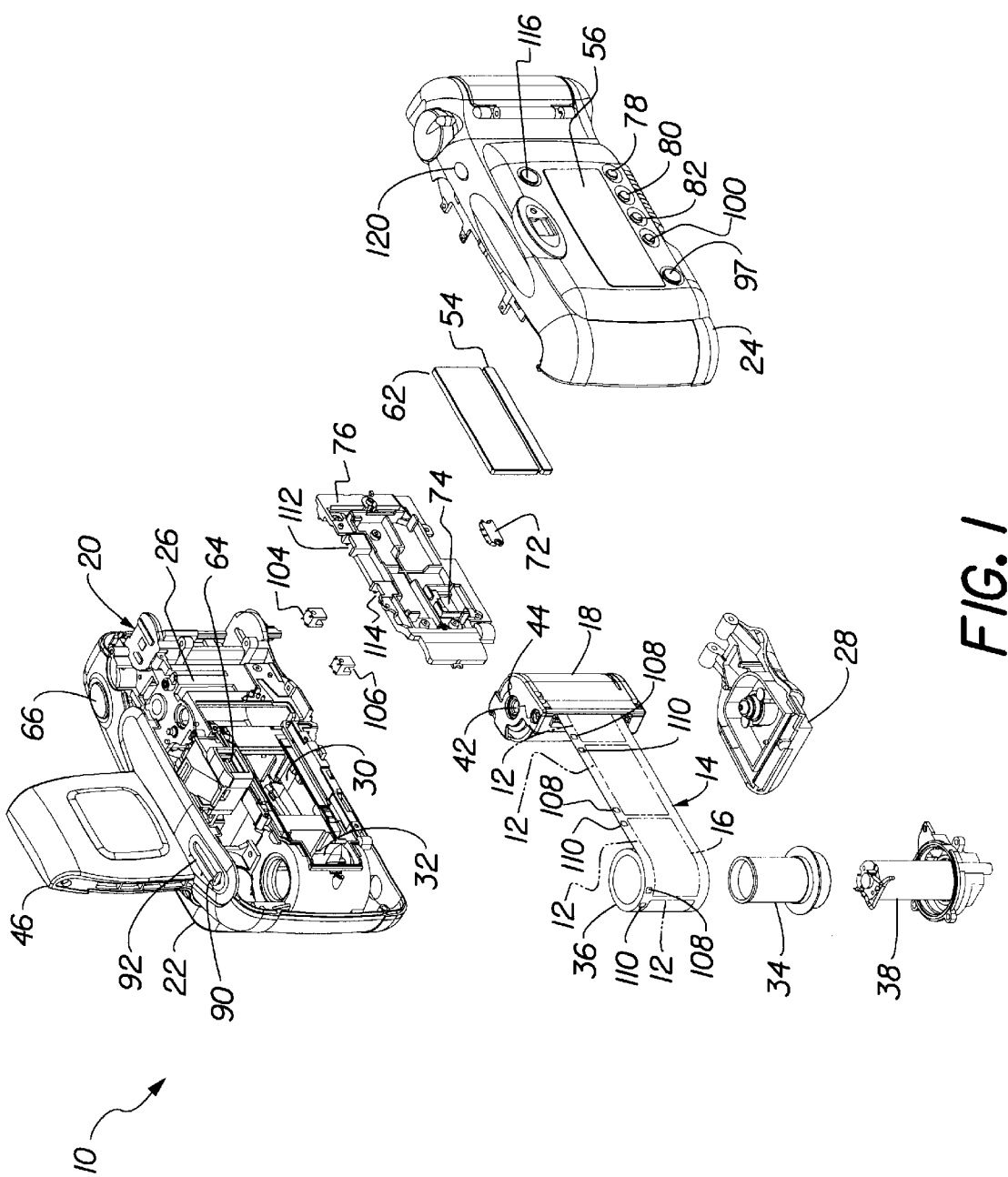
FIG. 1 is a rear exploded perspective view of a dual film image and electronic image capture camera that is a preferred embodiment of the invention.
Figure 2:
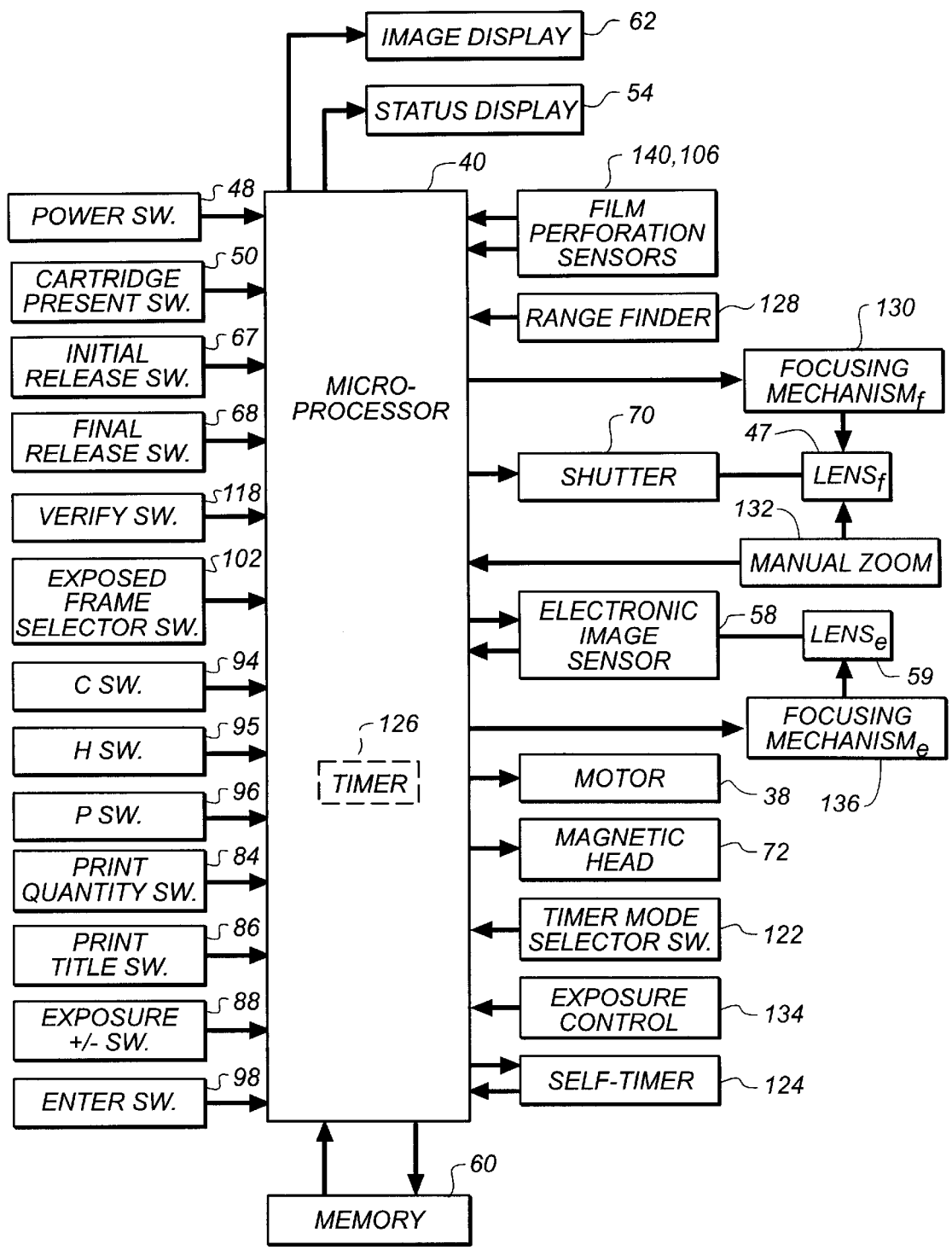
FIG. 2 is a block diagram of various components of the camera.

Referring now to the drawings, FIGS. 1 and 2 show a motorized film advance camera 10 for exposing latent images, i.e. captured film images of the subject being photographed, on successive frames 12 of a known "Advanced Photo System" ("APS") filmstrip 14. The filmstrip 14 has a transparent magnetic overlay which gives it magnetic recording capacity to store various user-selected information along a track 16 adjacent each exposed film frame 12, and it is normally housed in an opaque film cartridge 18. Typically, the "APS" filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open backframe opening 30 at which the respective frames 12 of the filmstrip 14 are temporarily positioned one at a time to be exposed, and an exposed film take-up chamber 32 that contains a film take-up spool 34. The film take-up spool 34 is incrementally rotated following each film exposure, i.e. film image capture of the subject, to wind the most-recently exposed one of the film frames 12 onto an exposed film roll 36 on the spool and to position a fresh unexposed film frame at the backframe opening 30. When the film take-up spool 34 is incrementally rotated, the filmstrip 14 is advanced forward one frame increment which is slightly greater than a frame width. A drive motor 38 resides inside the film take-up spool 34 for incrementally rotating the spool to advance the filmstrip 14 forward one frame increment, and its operation is controlled by a known microcomputer or control 40 having a built-in microprocessor. When substantially the entire length of the filmstrip 14 is exposed, i.e. the total number of available frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the cartridge.

To magnetically record the user-selected information along the track 16 adjacent each exposed film frame 12, the motor 38 must be actuated after the exposed film length is rewound rearward into the film cartridge 18 to continuously rotate the film take-up spool 34 in order to advance the exposed film length forward. Then, the motor 38 is actuated after the information recording to continuously rotate the film spool inside the film cartridge 18 in order to rewind the film length with the recorded information rearward into the cartridge. Finally, the door 28 is pivoted open to remove the film cartridge 18 from the cartridge receiving chamber 26.

A known electronic flash unit 46 for flash assisted exposures is flipped up from partially covering the front cover part 22 to uncover a known film image capture or taking lens, $lens_f$, 47 preparatory to using the camera 10. See FIGS. 1 and 2. Flipping up the flash unit 46 closes a normally open power switch 48 connected to the microcomputer 40 to electrically power "on" the camera 10.

Figure 3:
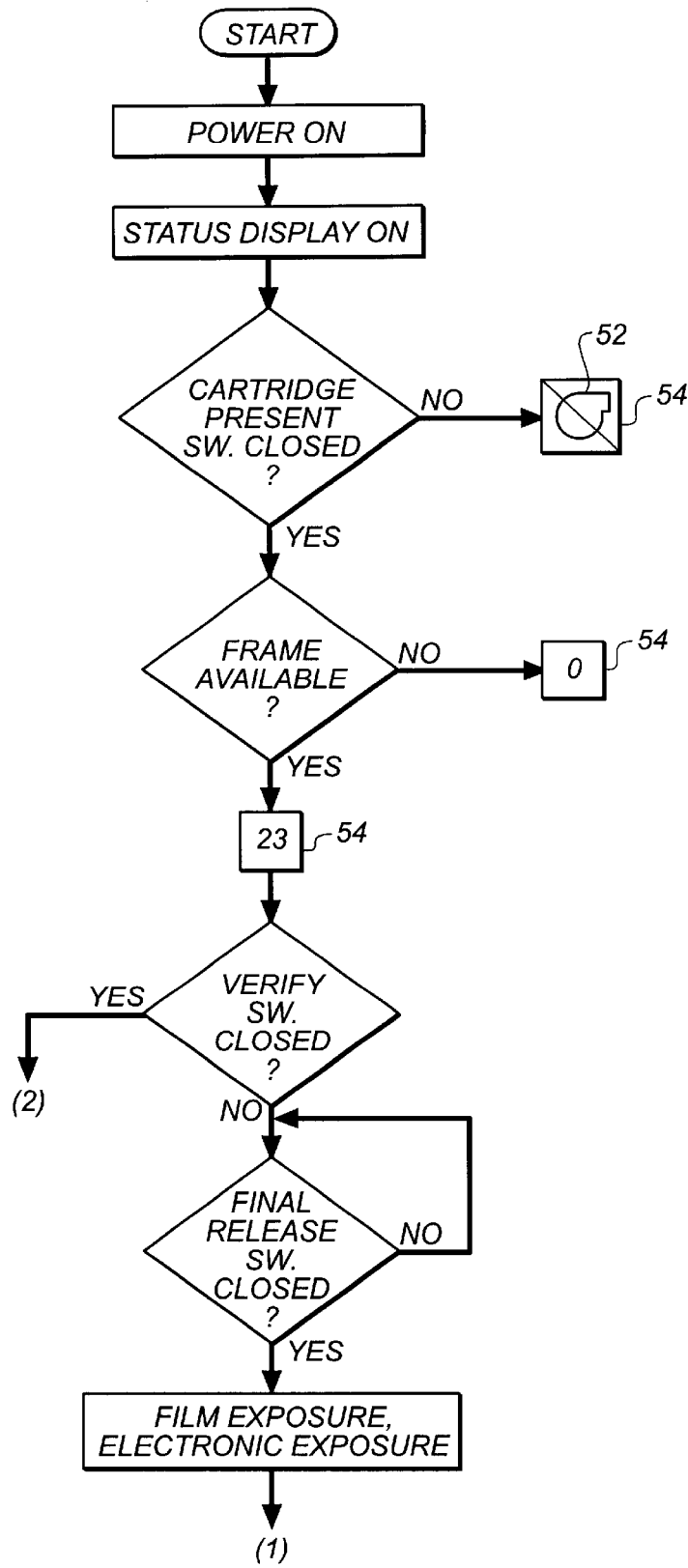
FIGS. 3, 4, 5, 6 and 7A, 7B are flow charts depicting operation of the camera.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and is located behind a window 56 in the rear cover part 24. See FIG. 1. If the camera 10 is powered "on" and the cartridge present switch 50 is closed, a visible cartridge loaded indication (not shown) is shown in the status display 54

A known electronic image sensor 58, for example a CCD sensor with integrated shuttering capability or a CMOS sensor with integrated shuttering capability, is fixed behind a known electronic image capture lens, $lens_e$, 59. Flipping up the electronic flash unit 46 uncovers the electronic image capture lens, $lens_e$, 59. The electronic image sensor 58 is connected to the microcomputer 40, and forms a different electronic image of the subject to provide electronic image capture of the subject each time one of the unexposed film frames 12 is exposed. The respective electronic images correspond to the latent images on the exposed film frames 12, are each stored in a memory 60 connected to the microcomputer 40, and can be shown one at a time in a known image display 62 such as a color LCD connected to the microcomputer. The image display 62 is located next to the status display 54, behind the window 56 in the rear cover part 24. The memory 60 has storage capacity for storing at least 40 electronic images, since the filmstrip 14 is available in 15-exposure, 25-exposure, and 40-exposure lengths. See FIGS. 1 and 2.

A known viewfinder 64 for viewing the subject (before it is photographed) is located on the main body part 20. See FIG. 1.

To take a picture of the subject, a shutter release button 66 on the front cover part 22 is manually depressed which in turn first closes a normally open initial release switch 67 connected to the microcomputer 40, when the shutter release button is partially depressed, and then closes a normally open final release switch 68 connected to the microcomputer, when the shutter release button is fully depressed. See FIGS. 1 and 2. The reason for closing the initial release switch 67 before optionally closing the final release switch 68 will be described subsequently in connection with pre-exposure operation of the camera 10. The closed final release switch 68 triggers momentary opening of a known normally closed shutter 70 to expose a latent image of the subject on the film frame 12 at the backframe opening 30, and to excite the electronic image sensor 58 to form an electronic image of the subject substantially simultaneously with exposure of the latent image.

A magnetic head 72 is mounted within an opening 74 in a film pressure platen 76 for magnetically recording the user-selected information along the track 16 adjacent each one of the exposed film frames 12. The film pressure platen 76 serves to support each film frame 12 flat for exposure at the backframe opening 30.

The user-selected information can be a single selected print title (optional) in English and other languages, a single selected print exposure correction +/− (optional), at least one selected known "APS" print format "C" (classic) and/or "H" (HDTV) and/or "P" (panoramic), and at least one selected C- and/or H- and/or P- print quantity number preferably ranging from 0–9 prints (to indicate 1, 2, 3, 4, 5, 6, 7, 8, 9, or 0 prints), for each one of the exposed film frames 12. This allows "C" and/or "H" and/or "P" print formats to be selected for any one of the exposed film frames 12, and a corresponding C-, H- or P- print quantity number 0–9 to be selected for each one of the "C", "H" and "P" print formats that have been selected for the same exposed film frame. For example, for a particular one of the exposed film frames 12, the print quantity and print format selections can be two "C" format prints, one "H" format print, and no (zero) "P" format prints. Thus, the expression "and/or" between "C", "H" and "P" (as is known) means any one of (1) only "C", only "H" or only "P", (2) "C", "H" and "P", (3) "C" and "H", (4) "C" and "P", and (5) "H" and "P" which constitute seven different available choices.

A print having a "C" format is typically 4 (height)×6 (width) inches. A print having a "H" format is typically 4 (height)×7 (width) inches. And a print having a "P" format is typically 4 (height)×10 (width) inches or 4 (height)×11.5 9 (width) inches. No matter which one(s) of the print formats is (are) selected, "C", and/or "H" and/or "P", the exposed frames 12 on the filmstrip 14 are always in the "H" format. As is known, this allows re-prints to be made in any of the three formats rather than just in the selected format.

The selected print title, print exposure correction, "C" and/or "H" and/or "P" print format(s), and C- and/or H- and/or P- print quantity number(s), for every one of the exposed film frames 12 are stored as corresponding designations or assignments in the memory 60 for the respective film frames. Individual visible indications of the selected print title, print exposure correction, and C- and/or H- and/or P- print quantity number(s), for any one of the exposed film frames 12 can be seen in the status display 54. Also, a visible indication of the selected "C" and/or "H" and/or "P" print format(s) for any one of the exposed film frames 12 can be seen in the image display 62 (preferably with the selected "C" and/or "H" and/or "P" print format(s) superimposed on the electronic image shown in the image display). When more than one of the "C", "H" and "P" print formats have been selected for any one of the exposed film frames 12, the visible indications of the selected print formats can be seen together, or alternatively they can be seen one at a time, in the image display 62.

Respective print quantity, title and exposure correction buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 in order to input C- and/or H- and/or P- print quantity number(s), title and exposure correction as designations or assignments to the memory 60 for a most-recently exposed one of the film frames 12 and to change the C- and/or H- and/or P- print quantity number(s), title and exposure correction stored in the memory 60 for any one of the exposed film frames 12. A three-position print format selection button 90 is supported on a top plate 92 for manual movement into any one of three C-, H- and P- print format selection positions, and when manually depressed once in any one of the three positions closes a corresponding one of three normally open C, H and P switches 94, 95 and 96 once. The C, H and P switches 94, 95 and 96 are individually connected to the microcomputer 40 in order to input "C" and/or "H" and/or "P" print format(s) as designations or assignments to the memory to the memory 60 for a most-recently exposed one of the film frames 12 and to change "C" and/or "H" and/or "P" print format(s) stored in the memory 60 for any one of the exposed film frames 12. To enter the newly selected information in the memory 60, an enter button 97 on the rear cover part 24 must be manually depressed which in turn closes a normally open enter switch 98 connected to the microcomputer 40.

The three-position print format selection button 90 remains in the last-used one of its three C-, H- and P- print format selection positions until such time as it is manually moved to another one of its three positions, i.e. the button does not default via a spring-urging to any one of the three positions. Although not shown, manual movement of the print format selection position button 90 to any one of its three C-, H- and P- print format selection positions can serve to adjust a known variable print format mask in the viewfinder 64 to view the subject to be photographed in a viewing format that matches the position of the button.

If the print quantity switch 84 is not closed one-to-ten times (to designate a print quantity number to be 1, 2, 3, 4, 5, 6, 7, 8, 9, or 0 prints) for a particular one of the selected "C", "H" or "P" print formats, a default print quantity number for that one selected print format is "1". The default print quantity number can be stored as such in the memory 60.

An exposed frame selector button 100 is provided on the rear cover part 24, and when manually depressed one or more times closes a normally open exposed frame selector switch 102 connected to the microcomputer 40 the same number of times, to change the electronic image and the "C", and/or "H" and/or "P" print format(s) shown in the image display 62 for any one of the exposed film frames 12, and to change the C- and/or H- and/or P- print quantity number(s), print title, and print exposure correction shown in the status display 54 for the same exposed film frame, to the electronic image and the user-selected information for another one of the exposed film frames. This is possible because the electronic images that match the exposed film frames, and the user-selected information for the exposed film frames, are stored in the memory 60. Thus, one can effectively scroll through the electronic images and the user-selected information stored in the memory 60 for the exposed film frames 12, and successively see the electronic images and the user-selected information for any one of the exposed film frames in the status and image displays 54 and 62. This is done in preparation for manually depressing the print quantity, title and exposure correction buttons 78, 80 and 82 and the print format selection button 90 to change the user-selected information stored in the memory 60 for any one of the exposed film frames 12.

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count (the number of available film frames 12) stored in the memory 60 by "1", each time the filmstrip 14 is advanced forward a frame increment and the most-recently exposed one of the film frames is wound onto the exposed film roll 36 on the film take-up spool 34. The frame count begins with "15", "25" or "40" depending whether the filmstrip 40 has a 15-exposure, 25-exposure, or 40-exposure length.

A verify (print preview) button 116 is provided on the rear cover part 24, and when manually depressed closes a normally open verify switch 118 connected to the microcomputer 40. See FIGS. 1 and 2. The closed verify switch 118 causes the electronic image and the "C" and/or "H" and/or "P" print format(s) stored in the memory 60 for the most-recently exposed one of the film frames 12 to be shown in the image display 62, and it causes the C- and/or H- and/or P- print quantity number(s), print title, and print exposure correction stored in the memory for the same exposed film frame to be shown in the status display 54. If, however the exposed frame selector switch 102 had been closed to change the electronic image and the "C" and/or "H" and/or "P" print format(s) shown in the image display 62 and to change C- and/or H- and/or P- the print quantity number(s), print title, and print exposure correction shown in the status display 54, from that for the most-recently exposed one of the film frames to that for an earlier exposed one of the film frames, then the closed verify switch 118 causes the electronic image and the user-selected information for the earlier exposed film frame to be shown in the displays.

A timer mode selector button 120 is provided on the rear cover part 24, and when manually depressed closes a normally open timer mode selector switch 122 connected to the microcomputer 40. See FIGS. 1 and 2. The timer mode selector button 120 is manually depressed when one intends to use a known built-in optional-use self timer 124 connected to the microcomputer 40. Normally, when one fully depresses the shutter release button 66 to close the final release switch 68 in order to take a picture of the subject, the closed final release switch triggers momentary opening of the shutter 70 to expose a latent image of the subject on the film frame 12 at the backframe opening 30, and to excite the electronic image sensor 58 to form an electronic image of the subject substantially simultaneously with exposure of the latent image. However, the self-timer 124 is connected to the microcomputer 40 to begin a predetermined time delay, e.g. 10 seconds, in order to temporarily put off this film image and electronic image capture of the subject when the shutter release button 66 is fully depressed following manual depression of the timer mode selector button 120. After the elapse of the predetermined time delay, the self-timer 124 triggers the film image and electronic image capture. Thus, the self-timer 122 gives one the opportunity to place himself in front of the camera 10 before the film image and electronic image capture can occur.

When the timer mode selector button 120 is manually depressed because one intends to use the self-timer 124, but the shutter release button 66 is not yet fully depressed to close the final release switch 68 in order to take a picture of the subject, the electronic image sensor 58 can be excited to form an electronic preview or 'set-up" image which then is shown in the image display 62. The electronic capture of the preview image would occur without any occurrence of film image capture, and the preview image when viewed in the image display 62 would allow one to determine whether the camera 10 is correctly positioned before taking the picture using the self-timer 124.

The three-position print format selection button 90 can be manually moved into any one of its C-, H- and P- print format selection positions, and when manually depressed in any one of the three positions closes a corresponding one of the C, H and P switches 94, 95 and 96 to superimpose the selected "C" and/or "H" and/or "P" print format(s) on the electronically captured preview image shown in the image display 62. This further helps one to determine whether the camera 10 is correctly positioned before taking the picture using the self-timer 124. Then, when the shutter release button 120 is fully depressed to close the final release switch 68 in order to take the picture, the image display 62 is turned "off".

The camera 10 includes known rangefinder coupled focusing, i.e. automatic focusing, in which a known rangefinder 128 determines the focused distance for the film image capture lens, lens$_f$, 47 when the initial release switch 67 is closed, and a known focusing mechanism$_f$ 130 automatically focuses the film image capture lens at the focused distance when the final release switch 68 is closed. The rangefinder 128 and the focusing mechanism$_f$ 130 are each connected to the microcomputer 40. See FIG. 2.

When the film image capture lens, lens$_f$, 47 is focused on the subject to give a sharp image of the subject, other objects in the scene closer to or farther from the lens$_f$ than the focused subject do not appear equally sharp. The decline of sharpness is gradual and there is a zone extending in front of and behind the focused subject where the blur is too small to be noticeable and can be accepted as sharp. This zone of acceptable sharpness is known as the depth of field of the lens. The limits of the depth of field (DOF$_f$) of the film image capture lens, lens$_f$, 47 are given by the known equations (in *Encyclopedia of Photography*, Third Edition, Stroebel and Zakia, © 1993 by Butterworth-Heinemann, page 197):

$$Dnear_f = u_f f_f^2 / (f_f^2 + N_f C_f u_f)$$

$$Dfar_f = u_f f_f^2 / (f_f^2 - N_f C_f u_f)$$

where: Dnear$_f$ is the near limit of the depth of field of the film image capture lens, lens$_f$;

Dfar$_f$ is the far limit of the depth of field of the film image lens, lens$_f$;

u$_f$ is the focused distance for the film image capture lens, lens$_f$;

$f_f$ is the focal length of the film image capture lens, lens$_f$;

$C_f$ is the circle of confusion for the film image capture lens, lens$_f$; and $N_f$ is the f-number of the lens$_f$ aperture.

The film image capture lens, lens$_f$, 47 is a known variable-focus zoom lens with, for example, a focal length ($f_f$) that can be continuously varied between 30 mm and 60 mm using a manual zoom 132 which is connected to the lens$_f$ and the microcomputer 40, and with an f-number ($N_f$) that can be discretely varied between f/5.6 and f/16. The circle of confusion ($C_f$) is, for example, 0.03565 mm in the case of a 6-inch wide print made at a magnification of approximately 5.7× from a 27.4-mm wide negative of anyone of the exposed film frames 12, and is stored in the memory 60. A known automatic exposure control 134 including a photocell determines the f-number ($N_f$) based on measured ambient light and is connected to the microcomputer 40.

Figure 8:
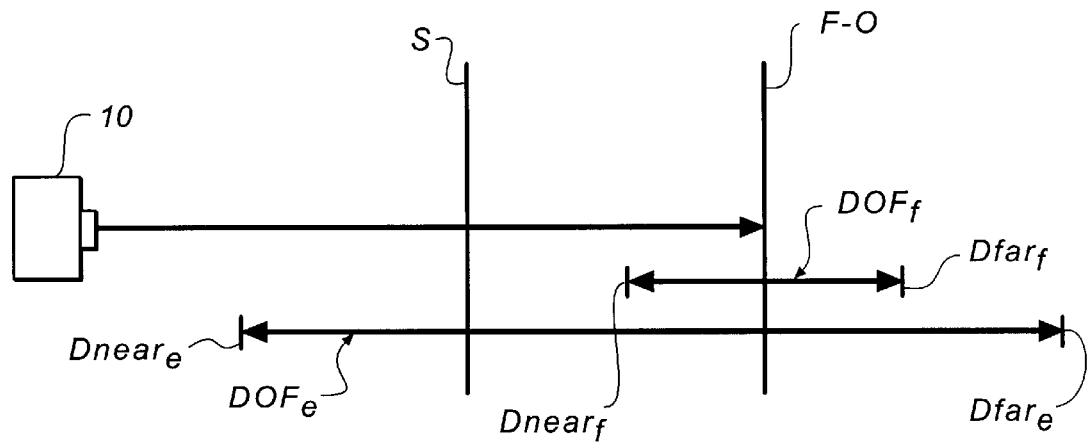
FIGS. 8 and 9 schematically depict PRIOR ART problems solved by the invention.

The electronic image capture lens, lens$_e$, 59 is separate from the film image capture lens, lens$_f$, 47 and has a depth of field (DOF$_e$) with near (Dnear$_e$) and far (Dfar$_e$) limits that are spaced farther apart than the near and far limits (Dnear$_f$ and Dfar$_f$) of the depth of field (DOF$_f$) of the film image capture lens. Consequently, in the PRIOR ART as shown in FIG. 8 when the rangefinder 128 misranges to a far object F-O farther from the camera 10 than a subject S to automatically focus the film image capture lens, lens$_f$, 47 on the far object (rather than on the subject), the captured electronic image of the subject can appear to be acceptably sharp or in focus in the image display 62 provided the subject remains in the depth of field (DOF$_e$) of the electronic image capture lens, lens$_e$, 59. However, the captured film image of the subject S will be blurred or out of focus when the subject is between the near limit (Dnear$_f$) of the depth of field (DOF$_f$) of the film image capture lens, lens$_f$, 47 and the camera 10. This typically occurs when the subject S is positioned off-center in the scene and the rangefinder 128 unintentionally misranges to a centered (far) object in the background of the scene.

Figure 9:
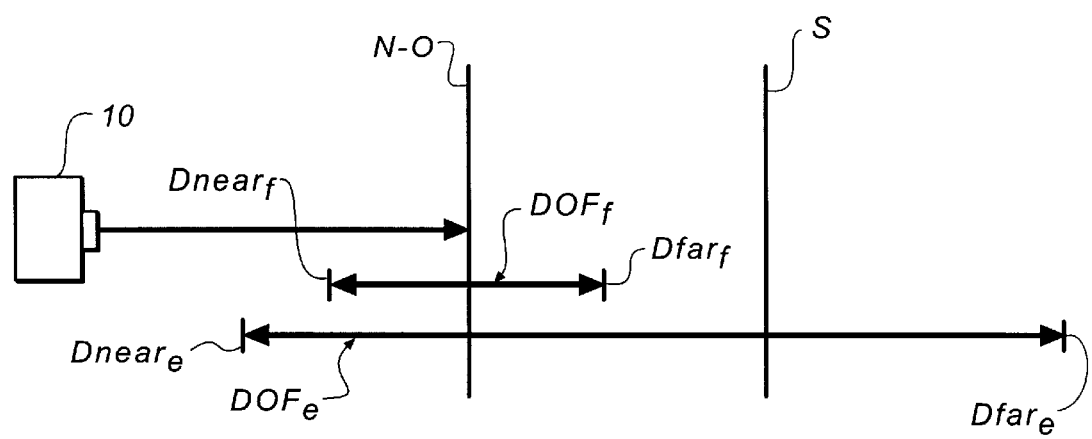

Alternatively, in the PRIOR ART shown in FIG. 9, when the rangefinder 128 misranges to a near object N-O closer to the camera 10 than a subject S to automatically focus the film image capture lens, lens$_f$, 47 on the near object (rather than on the subject), the captured electronic image of the subject can appear to be acceptably sharp or in focus in the image display 62 provided the subject remains in the depth of field (DOF$_e$) of the electronic image capture lens, lens$_e$, 59. However, the captured film image of the subject S will be blurred or out of focus when the subject is farther from the camera 10 than the far limit (Defar$_f$) of the depth of field (DOF$_f$) of the film image capture lens, lens$_f$, 47. This will occur when the subject S is positioned off-center in the scene and the rangefinder 128 unintentionally misranges to a centered (near) object in the foreground of the scene.

To solve the problem depicted in FIG. 8, a known focusing mechanism$_e$, 136 for the electronic image capture lens, lens$_e$, 59 is connected to the microcomputer 40 to automtically focus the electronic image capture lens at a focused distance U$_e$. at which the near limit (Dnear$_e$) of the depth of field (DOF$_e$) of the electronic image capture lens at least substantially matches the near limit (Dnear$_f$) of the depth of field (DOF$_f$) of the film image capture lens, lens$_f$, 47. The focused distance U$_e$ for the electronic image capture lens, lens$_e$, 59 at which the near limit (Dnear$_e$) of the depth of field (DOF$_e$) of the electronic image capture lens matches the near limit (Dnear$_f$) of the depth of field (DOF$_f$) of the film image capture lens, lens$_f$, 47 is calculated by the equation $$U_e = Dnear_f f_e^2 / (f_e^2 - Dnear_f N_e C_e)$$

where: U$_e$, is the focused distance for the electronic image capture lens, lens$_e$;

$f_e$ is the focal length of the electronic image capture lens, lens$_e$;

$C_e$ is the circle of confusion for the electronic image capture lens, lens$_e$; and $N_e$ is the f-number of the lens$_e$ aperture. If in FIG. 8, the near limit (Dnear$_e$) of the depth of field (DOF$_e$) of the electronic image capture lens, lens$_e$, 59 at least substantially matched the near limit (Dnear$_f$) of the depth of field (DOF$_f$) of the film image capture lens, lens$_f$, 47, the subject S would be between the near limit (Dnear$_e$) of the depth of field (DOF$_e$) of the electronic image capture lens and the camera 10, in addition to being between the near limit (Dnear$_f$) of the depth of field (DOF$_f$) of the film image capture lens and the camera. Thus, the captured electronic image would be blurred or out of focus in the image display 62.

To solve the problem depicted in FIG. 9, the focusing mechanism$_e$ 136 for the electronic image capture lens, lens$_e$, 59 automatically focuses the electronic image capture lens at a focused distance U$_e$ at which the far limit (Dfar$_e$) of the depth of field (DOF$_e$) of the electronic image capture lens at least substantially matches the far limit (Defar$_f$) of the depth of field (DOF$_f$) of the film image capture lens, lens$_f$, 47. The focused distance U$_e$ for the electronic image capture lens, lens$_e$, 59 at which the far limit (Dfar$_e$) of the depth of field (DOF$_e$) of the electronic image capture lens matches the far limit (Defar$_f$) of the depth of field (DOF$_f$) of the film image capture lens, lens$_f$, 47 is calculated y the equation $$U_e = Dfar_f f_e^2 / (f_e^2 + Dfar_f N_e C_e)$$

where: U$_e$ is the focused distance for the electronic image capture lens, lens$_e$;

$f_e$ is the focal length of the electronic image capture lens, lens$_e$;

$C_e$ is the circle of confusion for the electronic image capture lens, lens$_e$; and $N_e$ is the f-number of the lens$_e$ aperture. If in FIG. 9, the far limit (Dfar$_e$) of the depth of field (DOF$_e$) of the electronic image capture lens, lens$_e$, 59 at least substantially matched the far limit (Defar$_f$) of the depth of field (DOF$_f$) of the film image capture lens, lens$_f$, 47, the subject S would be farther from the camera 10 than the far limit (Dfar$_e$) of the depth of field (DOF$_e$) of the electronic image capture lens, in addition to being farther from the camera than the far limit (Defar$_f$) of the depth of field (DOF$_f$) of the film image capture lens. Thus, the captured electronic image would be blurred or out of focus in the image display 62.

The electronic image capture lens, lens$_e$, 59 is a variable-focus automatic zoom lens with, for example, a focal length ($f_e$) that can be continuously varied between 3.5 mm and 7.0 mm in accordance with the focal length ($f_f$) of the film image capture lens, lens$_f$, 47, and an f-number ($N_e$) that is fixed at f/2.4 and stored in the memory 60. The circle of confusion ($C_e$) is, for example, 0.028 mm at the electronic image sensor 58, and is stored in the memory 60. The microcomputer 40 determines the focal length ($f_e$) of the electronic image capture lens, lens$_e$, 59 after the focal length ($f_f$) of the film image capture lens, lens$_f$, 47 is manually set via the manual zoom 132. Selection of the focal length ($f_e$) of the electronic image capture lens, lens$_e$, 59 is automatically slaved to selection of the focal length ($f_f$) of the film image capture lens, lens$_f$, 47.

Operation

A. Non-Self-Timer Mode (FIGS. 3–5)

Figure 4:
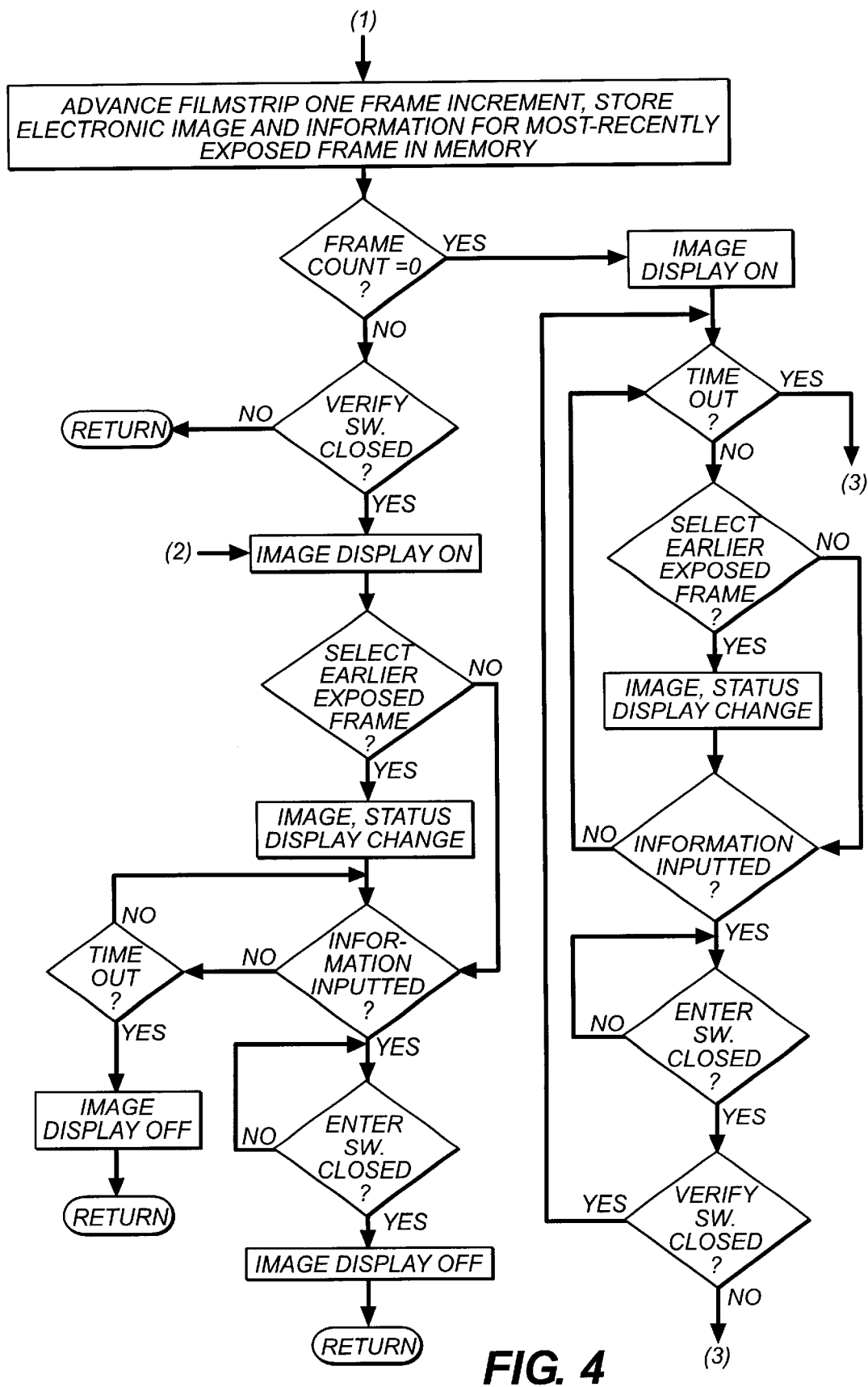
Figure 5:
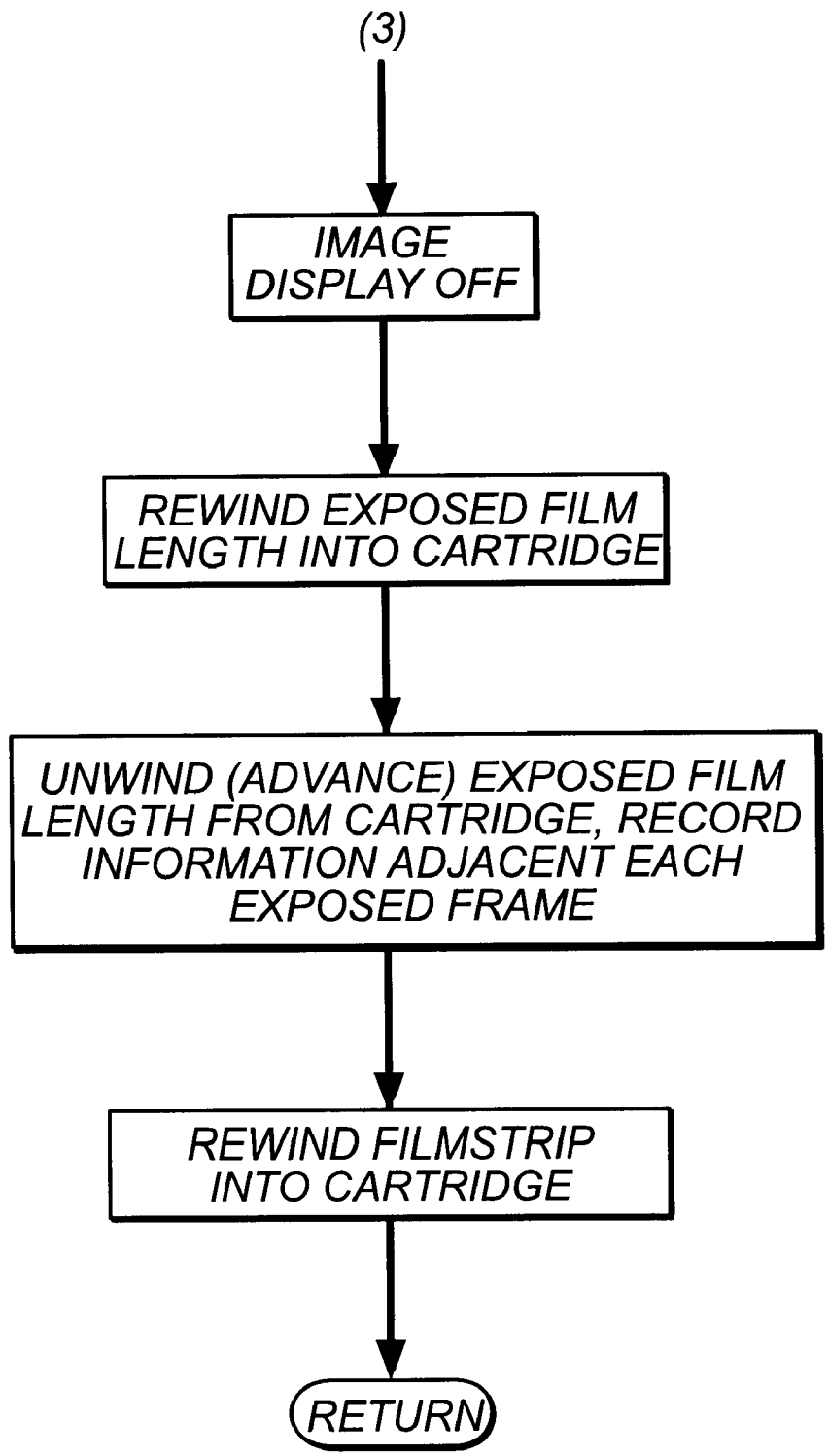

Partial operation of the camera 10 without the optional-use self-timer 124 is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count (the number of available film frames 12) stored in the memory 60.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively an earlier exposed one) of the film frames 12. Also, the status display 54 now shows the user-selected information stored in the memory 60 for the same exposed film frame, except that the visible indication of the selected "C" and/or "H" and/or "P" print format(s) for that exposed film frame is shown in the image display 62 superimposed on the electronic image.

7. If conversely in FIG. 3, the verify switch 118 remains open, and the final release switch 68 is not closed within an allotted time, e.g. 150 seconds, determined by a timer 126 in the microcomputer 40, the camera 10 is powered "off" for battery conservation.

8. If conversely in FIG. 3, the verify switch 118 remains open, and the final release switch 68 is closed within the allotted time, e.g. 150 seconds, determined by the timer 126 in the microcomputer 40, because a picture of the subject is being taken, a latent image of the subject is exposed on the film frame 12 at the backframe opening 30 and the electronic image sensor 58 is excited to form an electronic image of the subject which matches the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image corresponding to the latent image on the most-recently exposed frame 12 and the user-selected information for the most-recently exposed frame are stored in the memory 60, and the frame count stored in the memory is decremented by "1", for example to "22."

10. If next in FIG. 4 the frame count in the memory 60 is greater than "0", the verify switch 114 can be closed.

11. If then in FIG. 4 the verify switch 118 is not closed within the allotted time, e.g. 150 seconds, determined by the timer 126 in the microcomputer 40, or alternatively the final release switch 68 is not closed within the same time, the camera 10 is powered "off" for battery conservation.

12. If conversely in FIG. 4 the verify switch 118 is closed within the allotted time (as in FIG. 3), e.g. 150 seconds, determined by the timer 126 in the microcomputer 40, the image display 62 is turned "on" to show the electronic image stored in the memory 60 corresponding to the latent image on the most-recently exposed one (or alternatively an earlier exposed one) of the film frames 12. Also, the status display 54 now shows the user-selected information for the same exposed film frame, except that the visible indication of the selected "C" and/or "H" and/or "P" print format(s) is shown in the image display 62 superimposed on the electronic image.

13. If next in FIG. 4 the exposed frame selector switch 102 is not closed within the allotted time, e.g. 150 seconds, determined by a timer 126 in the microcomputer 40, and none of the user-selected information switches 84, 86, 88 and 94–96 are closed within a brief time, e.g. 10 seconds, determined by the timer, the image display 62 is turned "off". The camera 10 including the status display 54 remains "on."

14. If conversely in FIG. 4 the exposed frame selector switch 102 is not closed within the allotted time, e.g. 150 seconds, determined by the timer 126 in the microcomputer 40, and at least one of the user-selected information switches 84, 86, 88 and 94–96 is closed within the brief time, e.g. 10 seconds, determined by the timer, then when the enter switch 98 is closed, the image display 62 is turned "off", and the electronic image and the new selected information for the most-recently exposed one of the film frames 12 are stored in the memory 60 in place of the previously stored information for the same exposed film frame.

15. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94–96 is closed within the brief time, e.g. 10 seconds, and the enter switch 98 is closed, the image display 62 is turned "off", and the electronic image and the new selected information for the earlier exposed film frame 12 are stored in the memory 60 in place of the previously stored information for the same exposed film frame.

16. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "C" and/or "H" and/or "P" print format(s) is shown in the image display 62 superimposed on the electronic image. The image display 62 is turned "on" in this instance (as compared with the other instance in FIG. 4 that it is turned "on") without having to first close the verify switch 118.

17. If next in FIG. 4, the unexposed frame selector switch 102 is not closed within the allotted time, e.g. 150 seconds, and none of the user-selected information switches 84, 86, 88 and 94–96 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18 from the cartridge receiving chamber 26.

18. If conversely in FIG. 4 the unexposed frame selector switch 102 is not closed within the allotted time, e.g. 150 seconds, and at least one of the user-selected information switches 84, 86, 88 and 94–96 is closed within the brief time, e.g. 10 seconds, the image display 62 remains "on." Then when the enter switch 98 is closed and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

19. If alternatively in FIG. 4 the unexposed frame selector switch 102 is closed within the allotted time, e.g. 150 seconds, the electronic image and the user-selected information stored in the memory 60 for any one of the earlier exposed film frames (not the most-recently exposed film frame) is shown in the status and image displays 54 and 62. Then, when at least one of the user-selected information switches 84, 86, 88 and 94–96 is closed within the brief time, e.g. 10 seconds, and the enter switch 98 is closed, and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

20. If conversely in FIG. 4 the verify switch 118 is closed within the allotted time, e.g. 150 seconds, go back to step 17 above.

B. Self-Timer Mode (FIG. 6)

Figure 6:
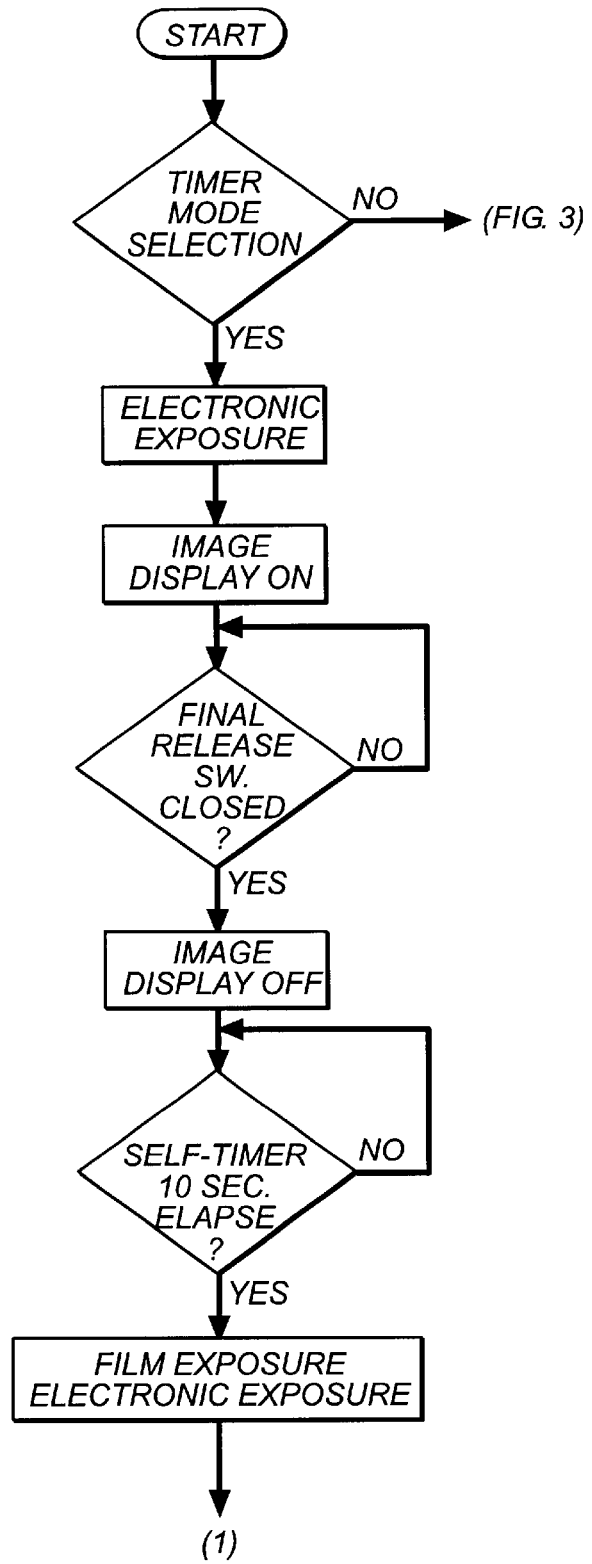

Partial operation of the camera 10 (to the extent not already described) with the optional-use self-timer 124 is shown in a flow chart in FIG. 6.

1. When the timer mode selector button 120 is manually depressed because one intends to use the self-timer 124, but the shutter release button 66 is not yet manually depressed to take a picture of the subject, the electronic image sensor 58 is excited to form an electronic preview image, which then is shown in the image display 62. The electronic capture of the preview image occurs without any occurrence of film image capture, and the preview image when viewed in the image display 62 allows one to determine whether the camera 10 is correctly positioned before taking the picture using the self-timer 124. Preferably, a reminder such as an icon or blinking warning that indicates there has not been any film image capture is shown in the image display 62, next to the displayed preview image.

2. The three-position print format selection button 90 can be manually moved into any one of its C-, H- and P- print format selection positions, and when manually depressed in any one of the three positions closes a corresponding one of the C, H and P switches 94, 95 and 96 to superimpose the selected "C" and/or "H" and/or "P" print format(s) on the electronically captured preview image shown in the image display 62. This further helps one to determine whether the camera 10 is correctly positioned before taking the picture using the self-timer 124.

3. If one determines that the camera 10 is not correctly positioned before taking the picture using the self-timer 124, he can repeat steps 1 and 3 above by repressing the timer mode selector button 120.

4. If one decides not to use the self-timer 124, the camera 10 must be powered "off".

5. When the camera 10 is correctly positioned to take the picture using the self-timer 124, the shutter release button 120 is manually depressed to turn "off" the image display 62. Then, after the predetermined time delay, e.g. 10 seconds, has elapsed, the self-timer 124 triggers momentary opening of the shutter 70 to expose a latent image of the subject on the film frame 12 at the backframe opening 30, and triggers exciting the electronic image sensor 58 to form an electronic image of the subject substantially simultaneously with exposure of the latent image.

C. Image Verification (FIGS. 7A, 7B)

Figure 7A:
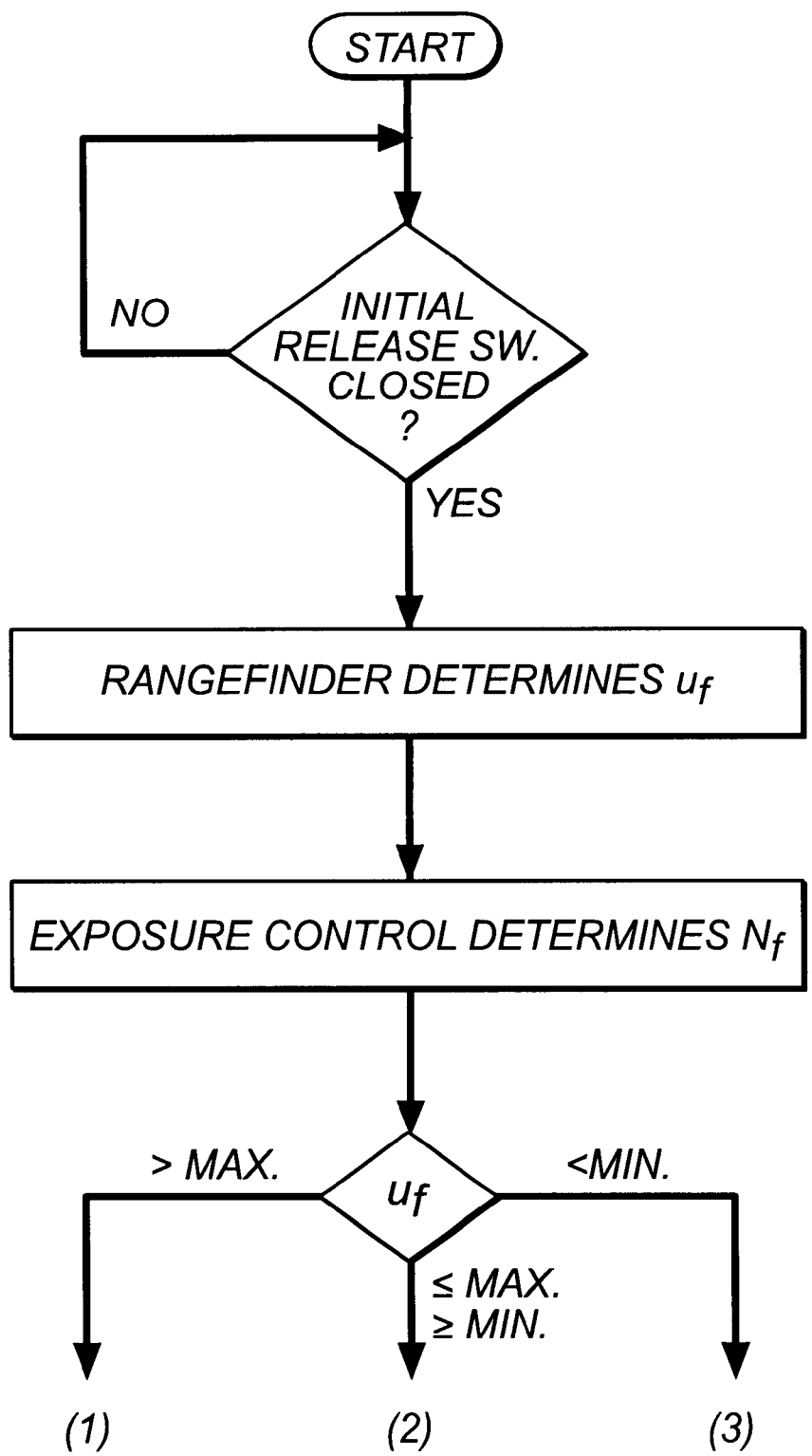
Figure 7B:
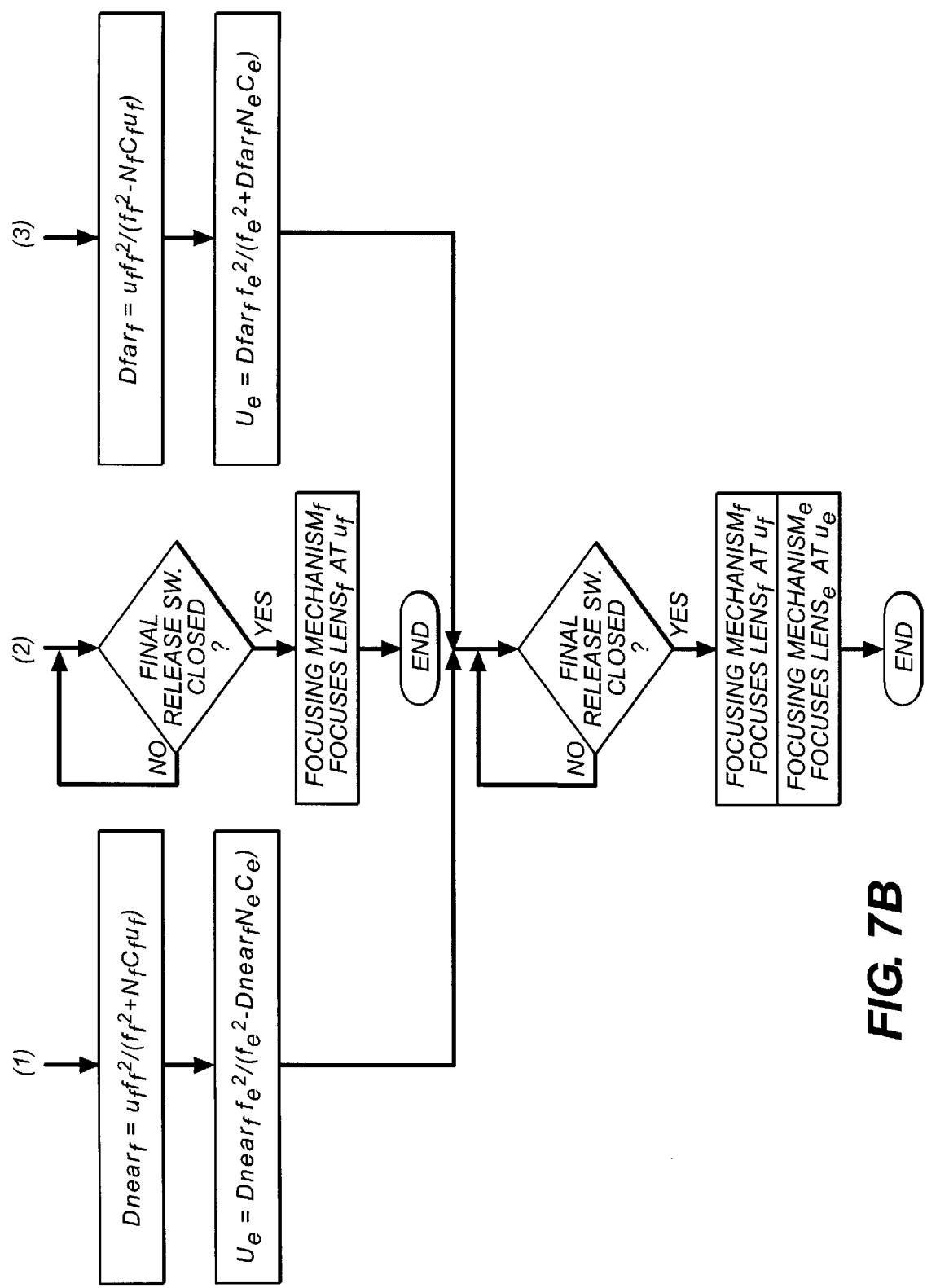

Partial operation of the camera 10 (to the extent not already described) for electronic image verification of film image misfocus is shown in a flow chart in FIGS. 7A, 7B.

1. When the initial release switch 67 (but not the final release switch 68) is closed, the microcomputer 40 orders the rangefinder 128 to determine the focused distance ($u_f$) for the film image capture lens, $lens_f$, 47. Also, the microcomputer 40 orders the exposure control 134 to determine the f-number ($N_f$) for the lens aperture based on measured ambient light.

2. Then, assuming the focal length ($f_f$) of the film image capture lens, $lens_f$, 47 has been set via the manual zoom 132, the microcomputer 40 determines whether the focused distance ($u_f$) for the film image capture lens is greater than a predetermined maximum distance stored in the memory 60, e.g. 3 m, is less than a predetermined minimum distance stored in the memory, e.g. 1.5 m, or otherwise is within the range max.–min., e.g. 1.5–3 m.

3. If the focused distance ($u_f$) for the film image capture lens, $lens_f$, 47 is greater than the predetermined maximum distance, the microcomputer calculates the near limit ($Dnear_f$) of the film image capture lens, $lens_f$, 47 using the equation $$Dnear_f = u_f f_f^2 / (f_f^2 + N_f C_f u_f).$$

4. Then, the microcomputer 40 calculates the focused distance ($U_e$) at which the near limit ($Dnear_e$) of the depth of field ($DOF_e$) of the electronic image capture lens, $lens_e$, 59 matches the near limit (Dnear$_f$) of the depth of field (DOF$_f$) of the film image capture lens, lens$_f$, 47 using the equation $$U_e = Dnear_f f_e^2 / (f_e^2 - Dnear_f N_e C_e).$$

5. When the final release switch 68 is closed, the microcomputer 40 orders the focusing mechanism$_f$ 130 to focus the film image capture lens, lens$_f$, 47 at the focused distance u$_f$ and orders the focusing mechanism$_e$ 136 to focus the electronic image capture lens, lens$_e$, 59 at the focused distance U$_e$.

6. If the focused distance (u$_f$) for the film image capture lens, lens$_f$, 47 is less than the predetermined minimum distance, the microcomputer 40 calculates the near limit (Dfar$_f$) of the film image capture lens, lens$_f$, 47 using the equation $$Dfar_f = u_f f_f^2 / (f_f^2 - N_f C_f u_f).$$

7. Then, the microcomputer 40 calculates the focused distance (U$_e$) at which the far limit (Dfar$_e$) of the depth of field (DOF$_e$) of the electronic image capture lens, lens$_e$, 59 matches the far limit (Dfar$_f$) of the depth of field (DOF$_f$) of the film image capture lens, lens$_f$, 47 using the equation $$U_e = Dfar_f f_e^2 / (f_e^2 + Dnear_f N_e C_e).$$

8. When the final release switch 68 is closed, the focusing mechanism$_f$ 130 focuses the film image capture lens, lens$_f$, 47 at the focused distance u$_f$ and the focusing mechanism$_e$ 136 focuses the electronic image capture lens, lens$_e$, 59 at the focused distance U$_e$.

9. If the focused distance (u$_f$) for the film image capture lens, lens$_f$, 47 is within the range max.–min., the focusing mechanism$_f$ 130 focuses the film image capture lens at the focused distance u$_f$ when the final release switch 68 is closed. Optionally, the focusing mechanism$_e$ 136 can focus the electronic image capture lens, lens$_e$, 59 at the focused distance U$_f$.

The invention has been described with reference to a preferred embodiment. However, it will be appreciated that variations and modifications can be effected by a person of ordinary skill in the art without departing from the scope of the invention. For example, when in FIG. 4 the enter switch 98 is not closed within an allotted time, e.g. 150 seconds, determined by the timer 126 in the microcomputer 40, and alternatively the final release switch 68 is not closed within the same time, the camera 10 could be powered "off" for battery conservation.

When in FIG. 6 the timer mode selector button 120 is manually depressed to excite the electronic image sensor 58 to form an electronic preview image, which then is shown in the image display 62, the electronic image sensor could have a "live" or "video" condition that would continuously or periodically re-excite the electronic image sensor to automatically update the preview image shown in the image display (without having to repress the timer mode selector button).

PARTS LIST 10. camera
12. film frames
14. filmstrip
16. track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spoolend
46. electronic flash unit
47. film image capture (or taking) lens, lens$_f$
48. power switch
50. cartridge present switch
52. no-cartridge warning
54. status display
56. window
58. electronic image sensor
59. electronic image capture lens, lens$_e$
60. memory
62. image display
64. viewfinder
66. shutter release button
67. initial release switch
68. final release switch
70. shutter
72. magnetic head
74. opening
76. film pressure platen
78. print quantity button
80. print title button
82. exposure correction button
84. print quantity switch
86. print title switch
88. exposure correction switch
90. format selection button
92. top plate
94. C switch
95. H switch
96. P switch
97. enter button
98. enter switch
100. exposed frame selector button
102. exposed frame selector switch
104. film perforation sensor
106. film perforation sensor
108. film perforation
110. film perforation
112. pocket
114. pocket
116. verify button
118. verify switch
120. timer mode selector button
122. timer mode selector switch
124. optional-use self-timer
126. timer
128. rangefinder
130. focusing mechanism
132. manual zoom
134. exposure control
136. focusing mechanism

What is claimed is:

1. A dual image camera for substantially simultaneously capturing a film image of a subject being photographed and an electronic image of the subject, comprises:
   a variable-focus film image capture lens having a depth of field with a pair of spaced near and far limits, focusable to give an acceptably sharp image of the subject provided the subject is between the near and far limits of the depth of field of said film image capture lens, and when misfocused on a far object farther from said camera than the subject will give a blurred image of the subject provided the subject is between the near limit of the depth of field of said film image capture lens and said camera;

a variable-focus electronic image capture lens having a depth of field with a pair of near and far limits spaced farther apart than the near and far limits of the depth of field of said film image capture lens, focusable to give an acceptably sharp image of the subject provided the subject is between the near and far limits of the depth of field of said electronic image capture lens, and when focused to match its near limit with the near limit of the depth of field of said film image capture lens will give a blurred image of the subject provided the subject is between the near limit of the depth of the field of said film image capture lens and said camera;

a display that shows a captured electronic image of the subject corresponding to a captured film image of the subject to permit one to verify they got the captured film image they wanted;

a focusing mechanism for focusing said film image and electronic image capture lenses and coupled with a rangefinder for determining a focused distance; and a control connected to said focusing mechanism and said rangefinder that makes said focusing mechanism focus said electronic image capture lens to match the near limit of the depth of field of said electronic image capture lens with the near limit of the depth of field of said film image capture lens when the focused distance is greater than a given distance, whereby said display will show a captured electronic image of the subject that verifies the captured film image of the subject is out of focus when the subject is between the near limit of the depth of field of said film image capture lens and said camera.

2. A dual image camera as recited in claim 1, wherein said control makes said focusing mechanism focus said electronic image capture lens according to the equation $$U_e = Dnear_f f_e^2 / (f_e^2 - Dnear_f N_e C_e)$$

where: $U_e$ is the focused distance for said electronic image capture lens;

$Dnear_f$ is the near limit of the depth of field of said film image capture lens;

$f_e$ is the focal length of said electronic image capture lens;

$C_e$ is the circle of confusion for said electronic image capture lens; and $N_e$ is the f-number of the lens aperture of said electronic image capture lens.

3. A dual image camera for substantially simultaneously capturing a film image of a subject being photographed and an electronic image of the subject, comprises:

a variable-focus film image capture lens having a depth of field with a pair of spaced near and far limits, focusable to give an acceptably sharp image of the subject provided the subject is between the near and far limits of the depth of field of said film image capture lens, and when misfocused on a near object closer to said camera than the subject will give a blurred image of the subject provided the subject is farther from said camera than the far limit of the depth of field of said film image capture lens;

a variable-focus electronic image capture lens having a depth of field with a pair of near and far limits spaced farther apart than the near and far limits of the depth of field of said film image capture lens, focusable to give an acceptably sharp image of the subject provided the subject is between the near and far limits of the depth of field of said electronic image capture lens, and when focused to match its far limit with the far limit of the depth of field of said film image capture lens will give a blurred image of the subject provided the subject is farther from said camera than the far limit of the depth of the field of said film image capture lens;

a display that shows a captured electronic image of the subject corresponding to a captured film image of the subject to permit one to verify they got the captured film image they wanted;

a focusing mechanism for focusing said film image and electronic image capture lenses and coupled with a range finder for determining a focused distance; and a control connected to said focusing mechanism and said rangefinder that makes said focusing mechanism focus said electronic image capture lens to match the far limit of the depth of field of said electronic image capture lens with the far limit of the depth of field of said film image capture lens when the focused distance is less than a given distance, whereby said display will show a captured electronic image of the subject that verifies the captured film image of the subject is out of focus when the subject is farther from said camera than the far limit of the depth of field of said film image capture lens.

4. A dual image camera as recited in claim 3, wherein said control makes said focusing mechanism focus said electronic image capture lens according to the equation $$U_e = Dfar_f f_e^2 / (f_e^2 + Dfar_f N_e C_e)$$

where: $U_e$ is the focused distance for said electronic image capture lens;

$Dfar_f$ is the far limit of the depth of field of said film image capture lens;

$f_e$ is the focal length of said electronic image capture lens;

$C_e$ is the circle of confusion for said electronic image capture lens; and $N_e$ is the f-number of the lens aperture of said electronic image capture lens.

5. A method in a dual image camera for making a captured electronic image of a subject shown in a display at least substantially match a captured film image of the subject in regard to sharpness when a film image capture lens is misfocused on a far object farther from the camera than the subject because of misranging to the far object, said method comprising the steps:

calculating $U_e$ using the equation $$U_e = Dnear_f f_e^2 / (f_e^2 - Dnear_f N_e C_e)$$

where: $U_e$ is the focused distance for an electronic image capture lens;

$Dnear_f$ is the near limit of the depth of field of the film image capture lens;

$f_e$ is the focal length of the electronic image capture lens;

$C_e$ is the circle of confusion for the electronic image capture lens; and $N_e$ is the f-number of the lens aperture of the electronic image capture lens, when the subject is between $Dnear_f$ and the camera, and focusing the electronic image capture lens at $U_e$.

6. A method as recited in claim 5, wherein a focused distance at which the film image capture lens is misfocused on the far object is determined by misranging to the far object, and the electronic image capture lens is focused according to the equation only when the focused distance for the film image capture lens is greater than a given distance.

7. A method as recited in claim 5, wherein $Dnear_f$ is calculated using the equation $$Dnear_f = u_f f_f^2 / (f_f^2 + N_f C_f u_f)$$

where: $u_f$ is the focused distance for the film image capture lens;

$f_f$ is the focal length of the film image capture lens;

$C_f$ is the circle of confusion for the film image capture lens; and $N_f$ is the f-number of the lens$_f$ aperture, when the subject is between $Dnear_f$ and the camera.

8. A method in a dual image camera for making a captured electronic image of a subject shown in a display substantially match a captured film image of the subject in regard to sharpness when a film image capture lens is misfocused on a near object closer to the camera than the subject because of misranging to the near object, said method comprising the steps:

calculating $U_e$ using the equation $$U_e = Dfar_f f_e^2 / (f_e^2 + Dfar_f N_e C_e)$$

where: $U_e$ is the focused distance for an electronic image capture lens;

$Dfar_f$ is the far limit of the depth of field of the film image capture lens;

$f_e$ is the focal length of the electronic image capture lens;

$C_e$ is the circle of confusion for the electronic image capture lens; and $N_e$ is the f-number of the lens aperture of the electronic image capture lens, when the subject is farther from the camera than $Dfar_f$, and focusing the electronic image capture lens at $U_e$.

9. A method as recited in claim 8, wherein a focused distance at which the film image capture lens is misfocused on the near object is determined by misranging to the near object, and the electronic image capture lens is focused according to the equation only when the focused distance for the film image capture lens is less than a given distance.

10. A method as recited in claim 8, wherein $Dfar_f$ is calculated using the equation $$Dfar_f = u_f f_f^2 / (f_f^2 - N_f C_f u_f)$$

where: $u_f$ is the focused distance for the film image capture lens;

$f_f$ is the focal length of the film image capture lens;

$C_f$ is the circle of confusion for the film image capture lens; and $N_f$ is the f-number of the lens$_f$ aperture, when the subject is farther from the camera than $Dfar_f$.

11. A method in a dual image camera for making a captured electronic image of a subject shown in a display substantially match a captured film image of the subject in regard to sharpness when a film image capture lens is misfocused on a far object farther from the camera than the subject because of misranging to the far object or is misfocused on a near object closer to the camera than the subject because of misranging to the near object, said method comprising the steps:

focusing an electronic image capture lens according to the equation $$U_e = Dnear_f f_e^2 / (f_e^2 - Dnear_f N_e C_e)$$

where: $U_e$ is the focused distance for the electronic image capture lens;

$Dnear_f$ is the near limit of the depth of field of the film image capture lens;

$f_e$ is the focal length of the electronic image capture lens;

$C_e$ is the circle of confusion for the electronic image capture lens; and $N_e$ is the f-number of the lens aperture of the electronic image capture lens, when the subject is between the near limit of the depth of field of the film image capture lens and the camera, and focusing an electronic image capture lens according to the equation $$U_e = Dfar_f f_e^2 / (f_e^2 + Dfar_f N_e C_e)$$

where $Dfar_f$ is the far limit of the depth of field of the film image capture lens, when the subject is farther from the camera than the far limit of the depth of field of the film image capture lens.

* * * * *